(12) United States Patent
Tsuji

(10) Patent No.: US 11,675,979 B2
(45) Date of Patent: Jun. 13, 2023

(54) INTERACTION CONTROL SYSTEM AND INTERACTION CONTROL METHOD USING MACHINE LEARNING MODEL

(71) Applicant: FUJITSU LIMITED, Kawasaki (JP)

(72) Inventor: Hirotaka Tsuji, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 308 days.

(21) Appl. No.: 16/687,965

(22) Filed: Nov. 19, 2019

(65) Prior Publication Data

US 2020/0175117 A1     Jun. 4, 2020

(30) Foreign Application Priority Data

Nov. 30, 2018   (JP) .............................. JP2018-225898

(51) Int. Cl.
| | |
|---|---|
| *G06F 40/30* | (2020.01) |
| *H04L 51/02* | (2022.01) |
| *G06N 5/04* | (2023.01) |
| *G06N 20/00* | (2019.01) |
| *G06F 3/0484* | (2022.01) |

(52) U.S. Cl.
CPC .............. *G06F 40/30* (2020.01); *G06N 5/04* (2013.01); *G06N 20/00* (2019.01); *H04L 51/02* (2013.01); *G06F 3/0484* (2013.01)

(58) Field of Classification Search
CPC ........ G06N 5/04; G06N 20/00; G06N 3/0445; G06N 3/08; G06N 5/041; H04L 51/02; H04L 51/32; G06F 3/0484; G06F 40/35
See application file for complete search history.

(56) References Cited

U.S. PATENT DOCUMENTS

| | | | | |
|---|---|---|---|---|
| 8,126,865 | B1 * | 2/2012 | Bharat .................. | G06F 16/972 |
| | | | | 707/706 |
| 9,495,331 | B2 * | 11/2016 | Govrin .................... | G06F 40/00 |
| 10,733,982 | B2 * | 8/2020 | Grupen .................. | G06F 40/35 |
| 10,762,903 | B1 * | 9/2020 | Kahan ..................... | G10L 15/26 |

(Continued)

FOREIGN PATENT DOCUMENTS

| | | |
|---|---|---|
| JP | 2007-17990 A | 1/2007 |
| JP | 2008-165785 A | 7/2008 |

(Continued)

*Primary Examiner* — Jesse S Pullias
(74) *Attorney, Agent, or Firm* — Fujitsu Patent Center

(57) ABSTRACT

A computer-implemented interaction control method includes determining, based on a first requirement, a first category from one or more categories estimated from each of a plurality of pieces of information input by a user, selecting, based on the determined first category, a first conversation topic for interaction with the user from conversation topics, executing, by using the first conversation topic, the interaction with the user via a user interface, determining, when detecting that the first conversation topic is inappropriate in accordance with a result of the interaction executed by using the first conversation topic, based on a second requirement, a second category from the one or more categories, selecting, based on the determined second category, a second conversation topic for the interaction with the user from the conversation topics, executing, by using the second conversation topic, the interaction with the user via the user interface.

13 Claims, 17 Drawing Sheets

(56) References Cited

U.S. PATENT DOCUMENTS

| | | | |
|---|---|---|---|
| 2005/0278180 A1* | 12/2005 | O'Neill | G10L 15/22 |
| | | | 704/275 |
| 2009/0009794 A1 | 1/2009 | Morikawa et al. | |
| 2009/0216756 A1 | 8/2009 | Arao | |
| 2014/0156276 A1* | 6/2014 | Nakano | G10L 15/222 |
| | | | 704/246 |
| 2014/0163959 A1* | 6/2014 | Hebert | G06F 40/30 |
| | | | 704/9 |
| 2015/0113439 A1 | 4/2015 | Kimura et al. | |
| 2016/0042735 A1* | 2/2016 | Vibbert | G10L 15/222 |
| | | | 704/257 |
| 2019/0130904 A1* | 5/2019 | Homma | G10L 15/26 |
| 2019/0147045 A1 | 5/2019 | Kim | |
| 2019/0237068 A1* | 8/2019 | Canim | G06F 16/288 |

FOREIGN PATENT DOCUMENTS

| | | |
|---|---|---|
| JP | 2009-16984 A | 1/2009 |
| JP | 2009-48303 A | 3/2009 |
| JP | 2009-205253 A | 9/2009 |
| JP | 2014-29668 A | 2/2014 |
| JP | 2014-102626 A | 6/2014 |
| JP | 2016-157474 A | 9/2016 |
| JP | 6218057 B1 | 10/2017 |
| WO | 2014/103645 A1 | 7/2014 |

* cited by examiner

FIG. 1
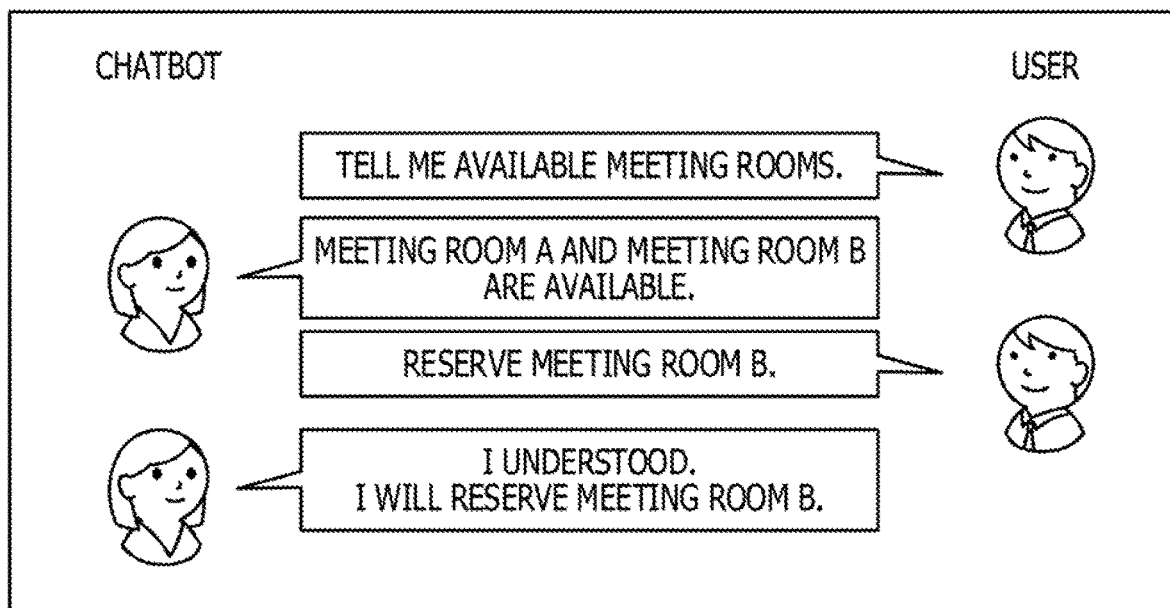
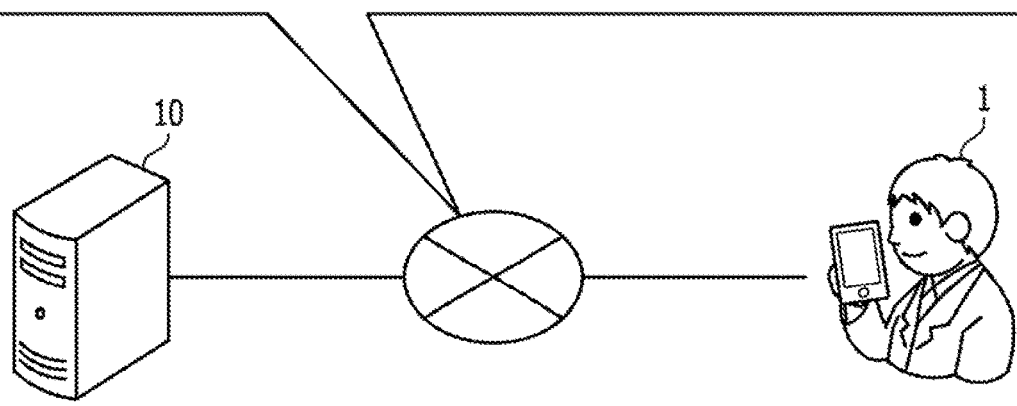

FIG. 3

| INTENTION LABEL | DATA (INQUIRY DETAIL) |
|---|---|
| I WANT TO RESERVE MEETING ROOM | RESERVE MEETING ROOM |
| I WANT TO RESERVE MEETING ROOM | I WANT TO SECURE MEETING ROOM |
| I WANT TO SPECIFY LOCATION OF MEETING ROOM | SECURE MEETING ROOM B |
| I WANT TO MAKE SCHEDULE FOR RESERVATION OF MEETING ROOM | MEETING DATE IS DAY AFTER TOMORROW |
| CONFIRMATION OF STATUS OF WAITING FOR CANCELLATION | I WANT TO CONFIRM STATUS OF WAITING FOR CANCELLATION |
| PROCEDURE FOR CANCELLATION | I DON'T KNOW HOW TO CANCEL |
| ... | ... |

FIG. 4

| LABEL | DATA |
|---|---|
| MEETING ROOM RESERVATION SCENARIO | INTENTION LABEL FOR CONVERSATION I WANT TO RESERVE MEETING ROOM |
| | INTENTION LABEL FOR CONVERSATION I WANT TO SPECIFY LOCATION |
| | INTENTION LABEL FOR CONVERSATION I WANT TO MAKE SCHEDULE |
| | INTENTION LABEL FOR CONVERSATION PROJECTOR FOR MEETING ROOM |
| PERSONAL COMPUTER RESERVATION SCENARIO | INTENTION LABEL FOR CONVERSATION I WANT TO RESERVE PERSONAL COMPUTER |
| | INTENTION LABEL FOR CONVERSATION I WANT TO SPECIFY DEVICE |
| | INTENTION LABEL FOR CONVERSATION I WANT TO SPECIFY SPECIFICATIONS |
| | INTENTION LABEL FOR CONVERSATION I WANT TO SPECIFY WIRELESS LAN-SUPPORTED |
| ... | ... |

FIG. 6

| DOMAIN | SCENARIO |
|---|---|
| MEETING ROOM RESERVATION DOMAIN | MEETING ROOM RESERVATION SCENARIO |
| | ... |
| DEVICE RESERVATION DOMAIN | ... |
| ... | ... |

FIG. 7

| KEYWORDS | | RESPONSE DETAIL | INTENTION LABEL | DOMAIN |
|---|---|---|---|---|
| MEETING ROOM | — | I WILL RESERVE **. | RESERVE MEETING ROOM | MEETING ROOM RESERVATION DOMAIN |
| | — | THERE IS NO AVAILABLE ROOM. | I WANT TO SECURE MEETING ROOM | MEETING ROOM RESERVATION DOMAIN |
| | AVAILABLE | ... | ... | ... |
| PERSONAL COMPUTER | RESERVE | I UNDERSTOOD. I WILL RESERVE **. | I WANT TO BORROW PERSONAL COMPUTER | DEVICE RESERVATION DOMAIN |
| | STATUS | ... | ... | ... |
| ... | ... | ... | ... | ... |

INTERACTION CONTROL SYSTEM AND INTERACTION CONTROL METHOD USING MACHINE LEARNING MODEL

CROSS-REFERENCE TO RELATED APPLICATION

This application is based upon and claims the benefit of priority of the prior Japanese Patent Application No. 2018-225898, filed on Nov. 30, 2018, the entire contents of which are incorporated herein by reference.

FIELD

The embodiments discussed herein are related to an interaction control technique.

BACKGROUND

In a frequently asked question (FAQ)-based system and in a search for a webpage, a task-oriented interactive system or an interactive system such as a question answering chatbot is used. In recent years, an interactive system is known, which learns interaction relationships between user's spoken words and audio responses to the user's spoken words, uses a learning model after the learning, selects a response detail based on a user's spoken word, and provides an audio response.

For example, related techniques have been disclosed in Japanese Laid-open Patent Publication No. 2014-29668, Japanese Laid-open Patent Publication No. 2009-48303.

SUMMARY

According to an aspect of the embodiments, a computer-implemented interaction control method includes determining, based on a first requirement, a first category from one or more categories estimated from each of a plurality of pieces of information input by a user, selecting, based on the determined first category, a first conversation topic for interaction with the user from conversation topics, executing, by using the first conversation topic, the interaction with the user via a user interface, determining, when detecting that the first conversation topic is inappropriate in accordance with a result of the interaction executed by using the first conversation topic, based on a second requirement, a second category from the one or more categories, selecting, based on the determined second category, a second conversation topic for the interaction with the user from the conversation topics, executing, by using the second conversation topic, the interaction with the user via the user interface.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an example of an entire configuration of an interactive system according to a first embodiment;

FIG. 3 is a diagram illustrating an example of information stored in a learning data DB for intentions;

FIG. 4 is a diagram illustrating an example of information stored in a learning data DB for scenarios;

FIG. 6 is a diagram illustrating an example of information stored in a scenario DB;

FIG. 7 is a diagram illustrating an example of information stored in an interaction DB;

DESCRIPTION OF EMBODIMENTS

Figure 2:
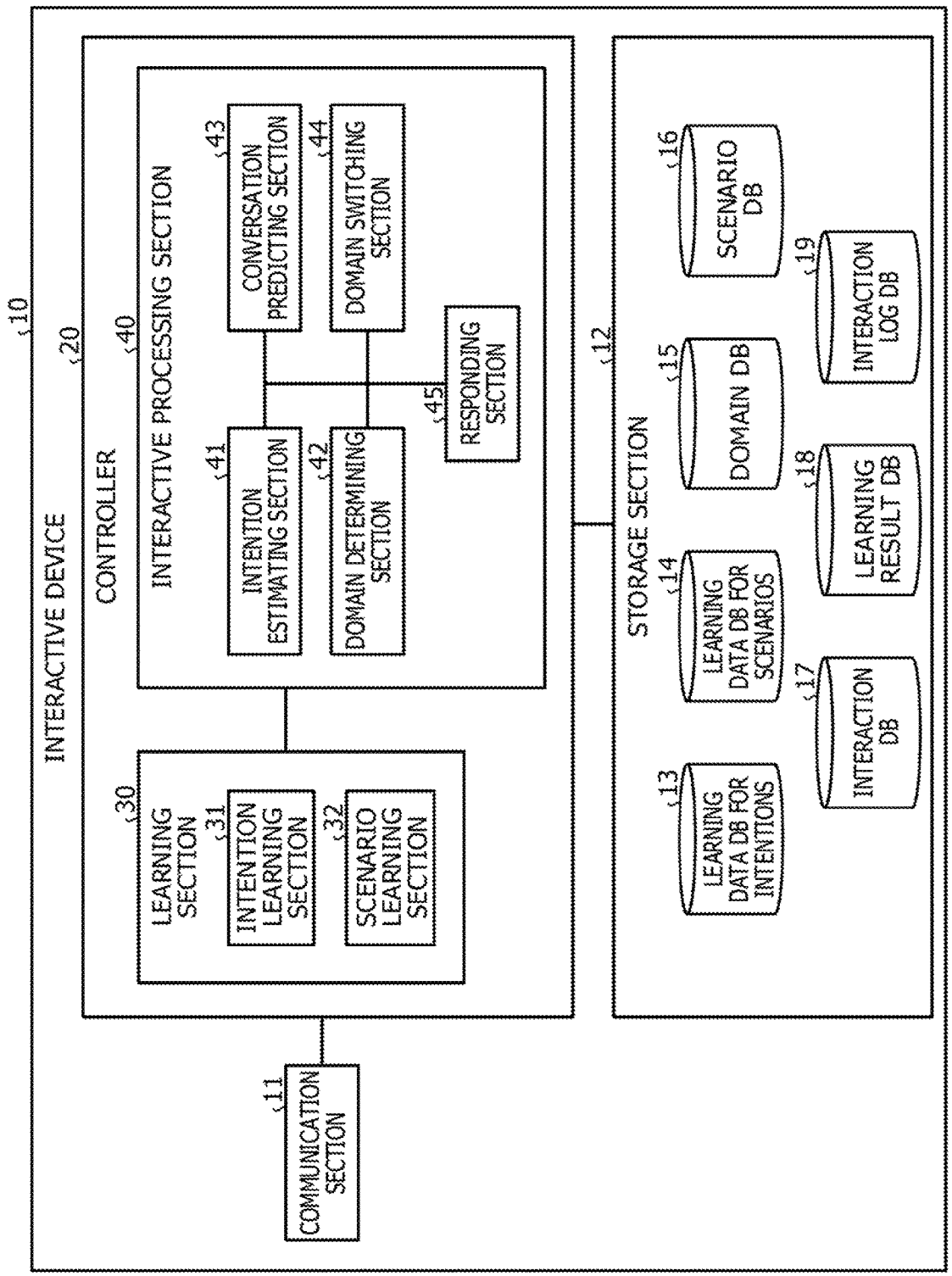
FIG. 2 is a functional block diagram illustrating a functional configuration of an interactive device according to the first embodiment.

For example, words spoken by a user at one time may include multiple intentions. In a traditional technique, since a single intention is determined among the multiple intentions and interaction is progressed, an error in the determined intention may not be recognized in the middle and the interaction may not be intended by a user and may be progressed. Thus, in a traditional interactive system, a level of discomfort of the user may increase and a problem that interaction is terminated in the middle of the interaction or the like may occur.

Hereinafter, embodiments of an interaction control system disclosed herein and an interaction control method disclosed herein are described in detail with reference to the drawings. The present disclosure is not limited by the embodiments. The embodiments may be combined without contradiction.

FIG. 1 is a diagram illustrating an example of an entire configuration of an interactive system according to a first embodiment. As illustrated in FIG. 1, the interactive system includes a user terminal 1 and an interactive device 10, which are coupled to and able to mutually communicate with each other via a network. The network may be a wired network or a wireless network. As the network, one or more of various communication networks such as a dedicated line and the Internet may be used. The first embodiment describes an example in which the interactive device 10 and a user interact with each other on a one-to-one basis. In the first embodiment, however, the interactive device 10 may interact with multiple users or may treat a group including multiple users as a single user and execute interaction in the same manner. The interactive system according to the first embodiment is an example of an interaction control system.

The user terminal 1 is an example of a computer device to be used by a user. The user terminal 1 is, for example, a personal computer, a smartphone, a mobile phone, or the like. The user terminal 1 uses a web browser or a dedicated application to access the interactive device 10 and executes interaction by audio inputting or character inputting. For example, the user terminal 1 provides various inquiries to the interactive device 10 and acquires results of the inquiries.

The interactive device 10 is an example of an interaction control device or information presenting device that establishes web communication or the like with the user terminal 1 and interacts with the user terminal 1. The interactive device 10 enables an interactive system such as a chatbot and executes autonomous interaction control for the user. For example, when user's spoken words "Tell me available meeting rooms." are input to the interactive device 10, the interactive device 10 provides an audio response "The meeting room A and the meeting room B are available." or the like.

In this system, the interactive device 10 identifies, for each of multiple information items input by the user, multiple categories estimated from the information item and a category, which is among the multiple categories and satisfies a first requirement. Then, the interactive device 10 selects, based on the identified category satisfying the first requirement, a conversation topic to be used in the interaction with the user from among multiple conversation topics. After that, when the interactive device 10 determines that the selected conversation topic is not appropriate, the interactive device 10 identifies multiple categories estimated from one or more information items included in the multiple information items and a category, which is among the multiple categories and satisfies a second requirement. Then, the interactive device 10 selects, based on the identified category satisfying the second requirement, another conversation topic to be used in the interaction with the user from among the multiple conversation topics.

For example, the interactive device 10 estimates multiple intentions of the user from a word (hereinafter referred to as user's spoken word in some cases) spoken and input by the user. Then, the interactive device 10 selects an intention estimated with the highest accuracy from among the estimated intentions and provides, to the user, a response (audio response) indicating a detail based on the selected intention. After that, upon receiving a next user's spoken word, the interactive device 10 estimates multiple intentions of the user from the user's spoken word. After that, when the estimated intentions are different from the intentions previously estimated, the interactive device 10 provides, to the user, a response indicating a detail that is based on an intention estimated with the second highest accuracy among the intentions estimated most recently and is not based on an intention estimated with the highest accuracy among the intentions estimated most recently.

By executing this, the interactive device 10 may estimate the flow of the interaction from histories of user's spoken words, quickly detect a change in the flow of the interaction and an error in an estimation result, and suppress the execution of interaction that is not intended by the user.

FIG. 2 is a functional block diagram illustrating a functional configuration of the interactive device 10 according to the first embodiment. As illustrated in FIG. 2, the interactive device 10 includes a communication section 11, a storage section 12, and a controller 20. The user terminal 1 has a configuration that is the same as or similar to an existing computer device. Thus, the user terminal 1 will not be described in detail.

The communication section 11 is a processing section that controls communication with the user terminal 1. The communication section 11 is, for example, a communication interface. For example, the communication section 11 establishes web communication with the user terminal 1 or establishes communication with the user terminal 1 via a chatbot and transmits and receives data on interaction to and from the user terminal 1.

The storage section 12 is an example of a storage device for storing data and a program to be executed by the controller 20 and is, for example, a memory, a hard disk, or the like. The storage section 12 stores a learning data DB 13 for intentions, a learning data DB 14 for scenarios, a domain DB 15, a scenario DB 16, an interaction DB 17, a learning result DB 18, and an interactive log DB 19.

The learning data DB 13 for intentions is a database for storing learning data to be used to learn a learning model for estimating an intention of the user from a user's spoken word. For example, the learning data DB 13 for intentions stores teacher data to be used to learn the learning model for estimating an intention.

FIG. 3 is a diagram illustrating an example of information stored in the learning data DB 13 for intentions. As illustrated in FIG. 3, the learning data DB 13 for intentions stores "intention labels" and "data (inquiry details)", while the "intention labels" are associated with the "data (inquiry details)" in the learning data DB 13. The "intention labels" stored in the learning data DB 13 are correct information of the learning data and correspond to so-called objective variables. The "data (inquiry details)" stored in the learning data DB 13 are information of the learning data and correspond to so-called explanatory variables. The example illustrated in FIG. 3 indicates that an intention label "I want to reserve a meeting room" is set as correct information for user's spoken words "Reserve a meeting room". Thus, when the user's spoken words are "Reserve a meeting room", an intention of the user is learned as "I want to reserve a meeting room".

The learning data DB 14 for scenarios is a database for storing learning data to be used to learn a learning model for estimating a scenario for interaction from the flow of intentions. For example, the learning data DB 14 for scenarios stores teacher data to be used to learn the learning model for scenario estimation.

FIG. 4 is a diagram illustrating an example of information stored in the learning data DB 14 for scenarios. As illustrated in FIG. 4, the learning data DB 14 for scenarios stores "labels" and "data", while the "labels" are associated with the "data" in the learning data DB 14. The "labels" stored in the learning data DB 14 are correct information of the learning data and correspond to so-called objective variables. The "data" stored in the learning data DB 14 is information of the learning data and corresponds to so-called explanatory variables.

The example illustrated in FIG. 4 indicates that, when an intention label of a conversation changes from "I want to reserve a meeting room" through "I want to specify a location" and "I want to make a schedule" to "A projector for a meeting room", the flow of the intention labels is learned as a "meeting room reservation scenario". The example illustrated in FIG. 4 also indicates that, when an intention label of a conversation changes from "I want to reserve a personal computer" through "I want to specify a device" and "I want to specify specifications" to "I want to specify a wireless LAN", the flow of the intention labels is learned as a "personal computer reservation scenario".

Figure 5:
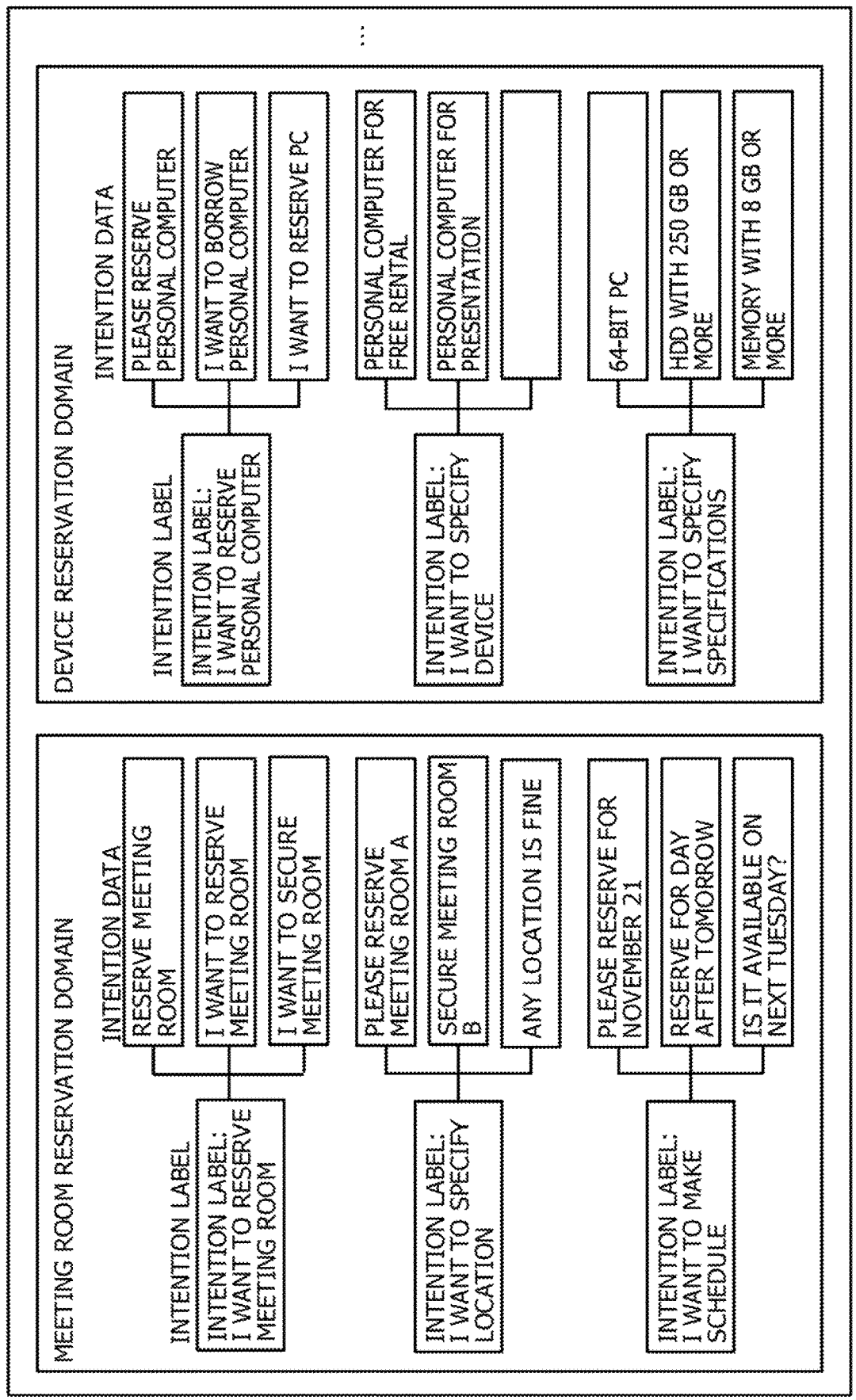
FIG. 5 is a diagram illustrating an example of information stored in a domain DB.

The domain DB 15 is a database for storing information on domains indicating ranges of interaction with the user. For example, the domain DB 15 stores information on conversation topics in interaction with the user. FIG. 5 is a diagram illustrating an example of information stored in the domain DB 15. As illustrated in FIG. 5, as an example, the domain DB 15 stores information belonging to a meeting room reservation domain and information belonging to a device reservation domain.

In the example illustrated in FIG. 5, the meeting room reservation domain includes, as intention labels, "I want to reserve a meeting room", "I want to specify a location", and "I want to make a schedule". The intention label "I want to reserve a meeting room" includes, as intention data, "Reserve a meeting room", "I want to reserve a meeting room", and "I want to secure a meeting room". The intention label "I want to specify a location" includes, as intention data, "Please reserve a meeting room", "Secure a meeting room", and "Any location is fine". The intention label "I want to make a schedule" includes, as intention data, "Please reserve for November 21", "Reserve for the day after tomorrow", and "Is a meeting room available on next Tuesday?".

The scenario DB 16 is a database for storing interaction scenarios included in the domains. FIG. 6 is a diagram illustrating an example of information stored in the scenario DB 16. As illustrated in FIG. 6, the scenario DB 16 stores "domains" and "scenarios", while the "domains" are associated with the "scenarios" in the scenario DB 16. The "domains" stored in the scenario DB 16 are the same as the domains stored in the domain DB 15. The "scenarios" stored in the scenario DB 16 are the interaction scenarios belonging to the domains. The example illustrated in FIG. 6 indicates that a "meeting room reservation domain" includes a "meeting room reservation scenario". Each of the domains includes one or more scenarios.

The interaction DB 17 is a database for storing information on details of responses, provided by the interactive device 10, to user's spoken words. FIG. 7 is a diagram illustrating an example of information stored in the interaction DB 17. As illustrated in FIG. 7, the interaction DB 17 stores "keywords", "response details", "intention labels", and "domains", while the "keywords", the "response details", the "intention labels", and the "domains" are associated with each other in the interaction DB 17. The "keywords" stored in the interaction DB 17 are keywords included in user's spoken words. The "response details" stored in the interaction DB 17 are details of responses to the user's spoken words. The "intention labels" stored in the interaction DB 17 are intention labels estimated from the user's spoken words. The "domains" stored in the interaction DB 17 indicate domains estimated from the user's spoken words.

In the example illustrated in FIG. 7, when the interactive device 10 receives user's spoken words including a "meeting room" and "reserve", estimates the intention label "Reserve a meeting room" from the user's spoken words, and estimates the "meeting room reservation domain" from the user's spoken words, the interactive device 10 provides an audio response "I will reserve .". In this case, the name of a meeting room actually reserved or the like is inserted in .

A method of identifying or selecting a response detail is not limited to the aforementioned method using the interaction DB 17 illustrated in FIG. 7 and may be any of known various methods. For example, as the method, user's spoken words and response details may be associated with each other on a one-to-one basis and stored, or response details may be automatically generated using keywords included in user's spoken words, or response details may be selected from among past histories.

The learning result DB 18 is a database for storing learning results. For example, the learning result DB 18 stores the learning model, learned by the controller 20, for intention estimation and the learning model, learned by the controller 20, for scenario estimation. For example, the learning result DB 18 stores results (classification results) of estimating learning data, and various parameters learned by machine learning and deep learning.

The interactive log DB 19 is a database for storing histories of interaction between the user terminal 1 and the interactive device 10. For example, the interactive log DB 19 stores user's spoken words, response details of the interactive device 10, estimated intention labels, estimated domains, estimated scenarios, and the like, while the user's spoken words, the response details of the interactive device 10, the estimated intention labels, the estimated domains, the estimated scenarios, and the like are associated with each other in the interactive log DB 19.

The controller 20 is a processing section that controls the entire interactive device 10. The controller 20 is, for example, a processor or the like. The controller 20 includes a learning section 30 and an interactive processing section 40. The learning section 30 and the interactive processing section 40 are an example of an electronic circuit such as a processor and are an example of a process to be executed by the processor.

The learning section 30 is a processing section that includes an intention learning section 31 and a scenario learning section 32 and learns the learning model for the intention estimation and the learning model for the scenario estimation. For the learning models, a long short-term memory (LSTM), a recurrent neural network (RNN), and the like are used.

The intention learning section 31 is a processing section that executes supervised learning using learning data stored in the learning data DB 13 for intentions and generates the learning model for the intention estimation. For example, when data "Reserve a meeting room" is input, the intention learning section 31 learns the learning model for the intention estimation to estimate the intention label "I want to reserve a meeting room". When data "I want to secure a meeting room" is input, the intention learning section 31 learns the learning model for the intention estimation to estimate the intention label "I want to reserve a meeting room". In the first embodiment, the intention learning section 31 learns the learning model for the intention estimation to estimate ten intentions from a single input data item.

Upon completing the learning, the intention learning section 31 causes results of the learning to be stored in the learning result DB 18. The time when the learning is terminated may be arbitrarily set to the time when the learning executed using a predetermined number of learning data items is completed, the time when a difference between correct information and a value output when learning data is input is equal to or smaller than a predetermined value, or the like.

The scenario learning section 32 is a processing section that executes supervised learning using learning data stored in the learning data DB 14 for scenarios and generates the learning model for the scenario estimation. For example, when the intention labels are detected in the order of the intention labels "I want to reserve a meeting room", "I want to specify a location", "I want to make a schedule", and "A projector for a meeting room", the scenario learning section 32 learns the learning model for the scenario estimation to estimate the "meeting room reservation scenario".

The scenario learning section 32 may use learning data stored in the learning data DB 14 for scenarios to learn, as an explanatory variable, the flow of intentions "I want to reserve a meeting room", "I want to specify a location", and "I want to make a schedule" and learn "A projector for a meeting room" as an objective variable, thereby generating the learning model for estimating a next intention from the flow (estimation order) of the intentions. In other words, the scenario learning section 32 may generate the learning model for estimating, from three user's intentions, a fourth intention of a user's spoken word that has yet to be spoken. For example, the scenario learning section 32 learns, as an explanatory variable, first to third learning data stored in the learning data DB 14 for scenarios and learns, as an objective variable, fourth learning data stored in the learning data DB 14 for scenarios.

Upon completing the learning, the scenario learning section 32 causes results of the learning to be stored in the learning result DB 18. The time when the learning is terminated may be arbitrarily set to the time when the learning executed using a predetermined number of learning data items is completed, the time when a difference between correct information and a value output when learning data is input is equal to or smaller than a predetermined value, or the like.

The first embodiment exemplifies the generation of the learning model for estimating a scenario from the flow of four intentions, but is not limited to this. For example, the learning model may estimate a scenario from the flow of two intentions. Alternatively, the scenario learning section 32 may generate multiple learning models, which include a learning model for estimating a scenario from the flow of two intentions and a learning model for estimating a scenario from the flow of three intentions.

The interactive processing section 40 is a processing section that includes an intention estimating section 41, a domain determining section 42, a conversation predicting section 43, a domain switching section 44, and a responding section 45 and executes interaction with the user terminal 1. The interactive processing section 40 estimates an intention from a user's spoken word and executes interaction within a domain to which the estimated intention belongs. In this case, the interactive processing section 40 estimates, from the flow of intentions, an intention of a word likely to be spoken by the user next and provides proposed audio.

The interactive processing section 40 determines, based on the estimation of intentions of user's spoken words, whether a domain is correct. When the estimated domain is different from an intention of the user, the interactive processing section 40 executes domain switching to switch the current domain to a domain based on the intention of the user and executes interaction. In this manner, the interactive processing section 40 enables the interaction based on the intention of the user.

The intention estimating section 41 is a processing section that estimates a user's intention from a detail of a user's spoken word. For example, the intention estimating section 41 reads a learning result from the learning result DB 18 and builds the learned learning model for the intention estimation. After that, upon detecting a user's spoken word, the intention estimating section 41 inputs a detail of the user's spoken word to the learned learning model for the intention estimation and acquires ten "intention labels" and ten levels of "estimation accuracy" as output results of the learning model for the intention estimation.

Figure 8:
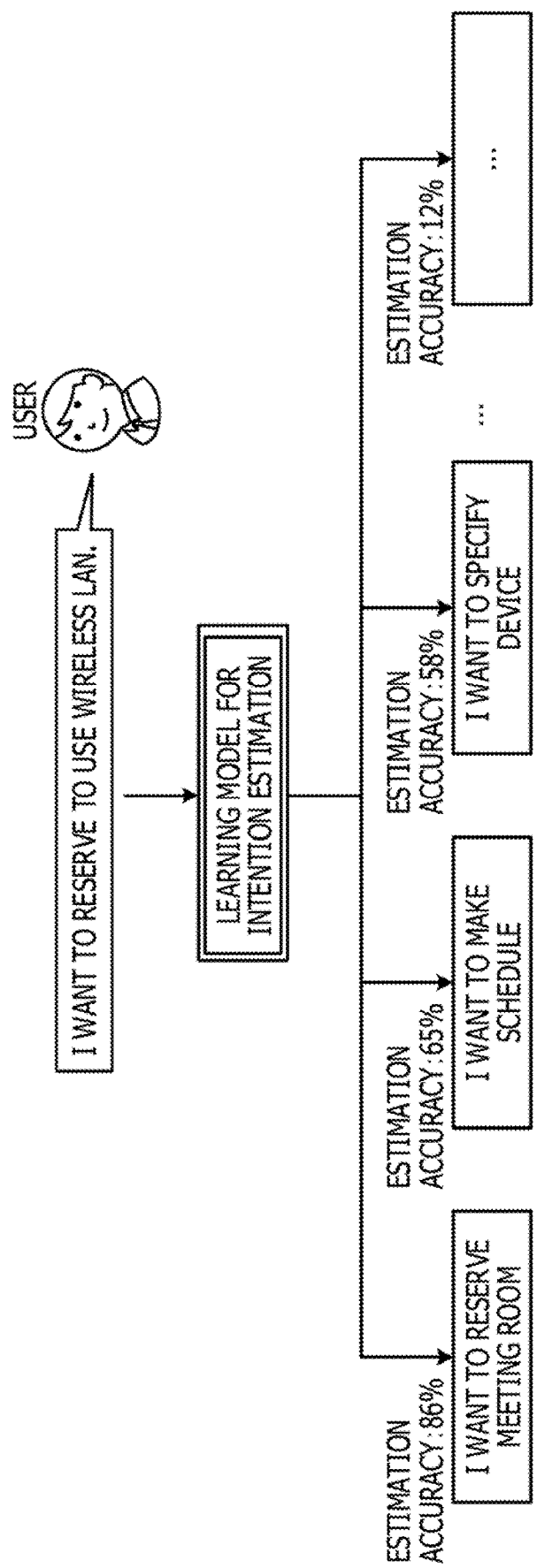
FIG. 8 is a diagram describing intention estimation.

FIG. 8 is a diagram describing the intention estimation. As illustrated in FIG. 8, upon detecting user's spoken words "I want to reserve to use a wireless LAN.", the intention estimating section 41 inputs, to the learned learning model for the intention estimation, the spoken words "I want to reserve to use an available wireless LAN.". Then, the intention estimating section 41 acquires, as output results of the learned learning model for the intention estimation, "I want to reserve a meeting room", 86%" and "I want to make a schedule, 65%". After that, the intention estimating section 41 outputs the estimation results to the domain determining section 42.

The domain determining section 42 is a processing section that determines whether a domain between the interactive device 10 and the user terminal 1 interacting with the interactive device 10 is appropriate. For example, the domain determining section 42 acquires estimation results from the intention estimating section 41 and selects an intention label estimated with the highest accuracy among the acquired estimation results. Then, the domain determining section 42 references the domain DB 15 and identifies a domain associated with the selected intention label.

When the identified domain is the same as the latest domain previously identified, the domain determining section 42 instructs the conversation predicting section 43 and the responding section 45 to execute a response process. When the identified domain is different from the domain previously identified, the domain determining section 42 instructs the domain switching section 44 to execute a domain switching process. The time when the domain switching is executed may be arbitrarily set to the time when a domain that is different from a domain previously identified is identified, the time when a domain that is different from a domain previously identified is continuously identified a predetermined number of times, or the like.

Figure 9:
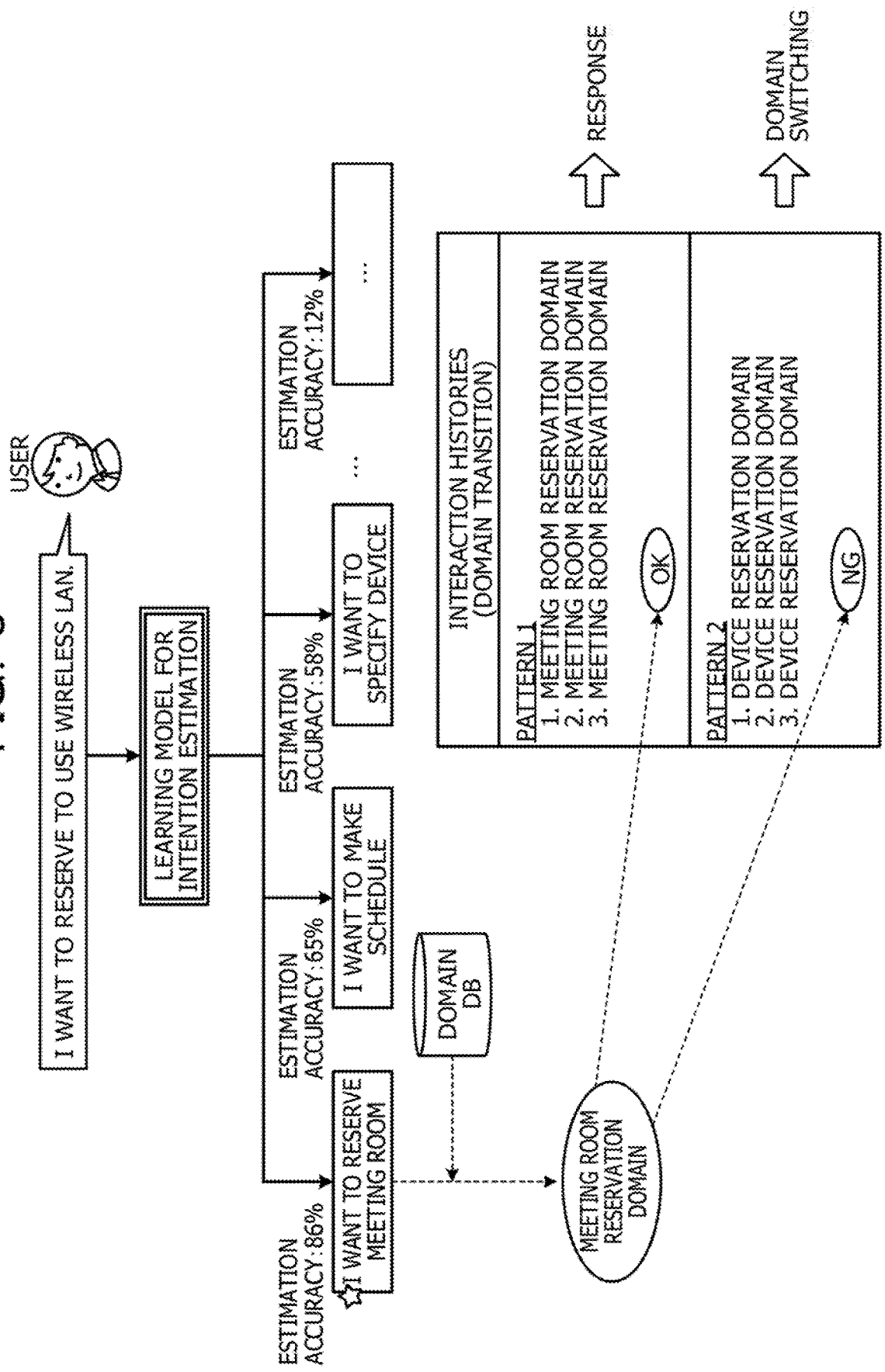
FIG. 9 is a diagram describing domain determination.

FIG. 9 is a diagram describing domain determination. As illustrated in FIG. 9, the domain determining section 42 identifies, from results of the estimation by the intention estimating section 41, an intention label "I will reserve a meeting room" estimated with the highest accuracy. Subsequently, the domain determining section 42 references the domain DB 15 and identifies the "meeting room reservation domain" to which the intention label "I will reserve a meeting room" belongs.

When the latest domain among domains identified in interaction between the interactive device 10 and the user terminal 1 interacting with the interactive device 10 matches the "meeting room reservation domain" identified most recently, the domain determining section 42 determines that the determination of the domain is appropriate (pattern 1). After that, the response process is executed within the "meeting room reservation domain".

When the latest domain among the domains identified in the interaction between the interactive device 10 and the user terminal 1 interacting with the interactive device 10 is different from the "meeting room reservation domain" identified most recently, the domain determining section 42 determines that the determination of the domain is not appropriate (pattern 2). After that, the domain switching process is executed.

When the "meeting room reservation domain" identified most recently is the domain identified first in the interaction, the domain determining section 42 determines the "meeting room reservation domain" as a domain for the interaction. After that, the response process is executed within the "meeting room reservation domain".

The conversation predicting section 43 is a processing section that predicts, from histories of user's spoken words, a user's word likely to be spoken by the user next and provides a proposed audio response to the user before the user speaks a word next. For example, when the domain determining section 42 instructs the conversation predicting section 43 to start the response process, the conversation predicting section 43 inputs an intention, estimated by the intention estimating section 41, of a user's spoken word to the learned learning model for the intention estimation and estimates an intention of a word likely to be spoken by the user next. Then, the conversation predicting section 43 provides, to the user, a response indicating a detail associated with the estimated intention of the word likely to be spoken by the user next.

Figure 10:
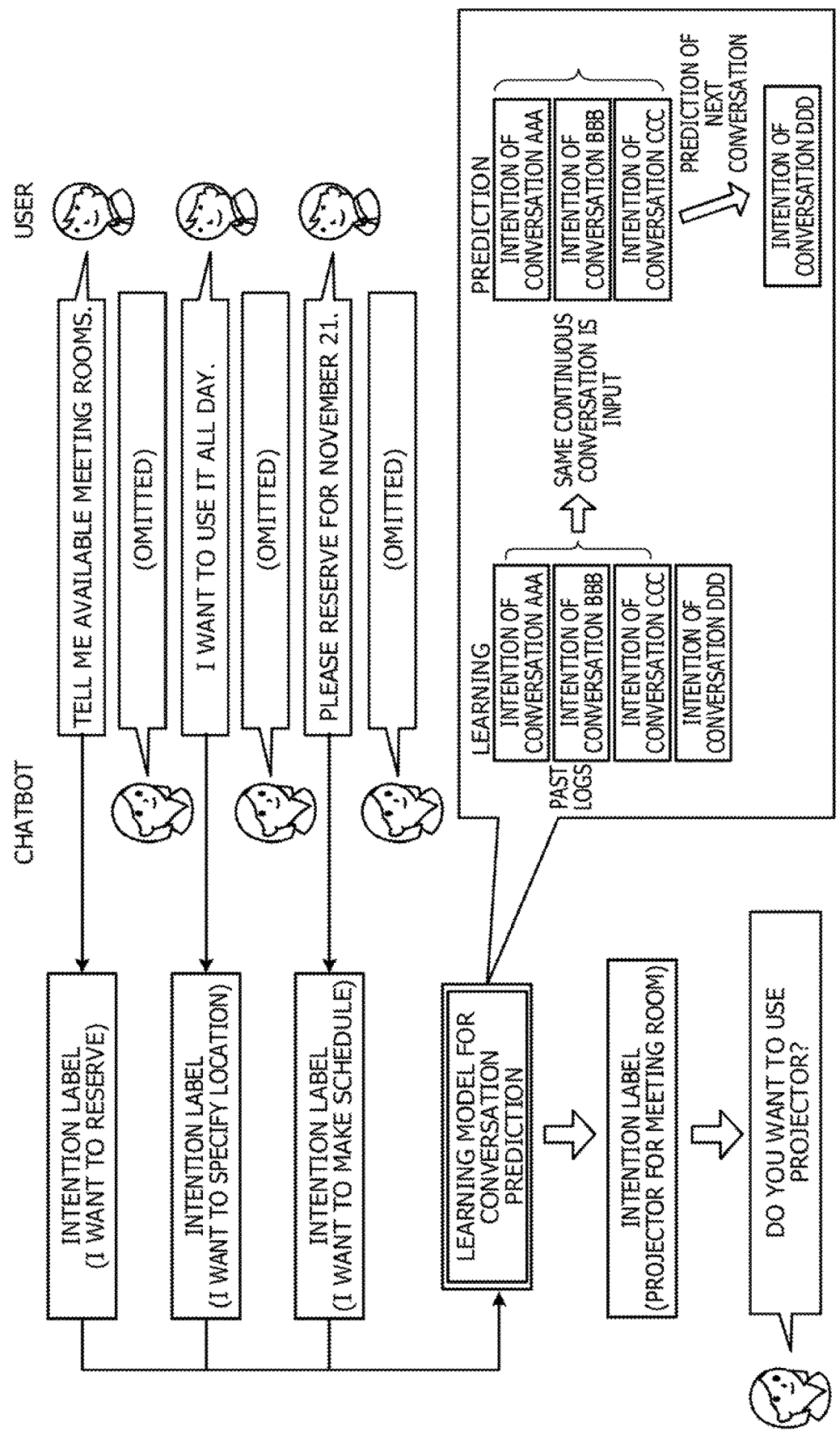
FIG. 10 is a diagram describing conversation prediction.

FIG. 10 is a diagram describing conversation prediction. As illustrated in FIG. 10, the intention estimating section 41 estimates "I want to reserve" as an intention label of the user's spoken words "I want to reserve to use a wireless LAN.", estimates "I want to specify a location" as an intention label of user's spoken words "I want to use it all day.", and estimates "I want to make a schedule" as an intention label of user's spoken words "Please reserve for November 21.".

In this case, the conversation predicting section 43 inputs, to the learning model for the intention estimation, the order in which the intention labels "I want to reserve", "I want to specify a location", and "I want to make a schedule" are estimated, and acquires the intention label "A projector for a meeting room" as a result of the estimation. For example, the conversation predicting section 43 uses learning results to estimate the intention label "A projector for a meeting room" as a next intention label from the order in which the intention labels "I want to reserve", "I want to specify a location", and "I want to make a schedule" are estimated. Then, the conversation predicting section 43 outputs the estimated intention label "A projector for a meeting room" to the responding section 45.

After that, the responding section 45 outputs an audio response for the intention label "A projector for a meeting room" before the user speaks a word next. For example, the conversation predicting section 43 references the domain DB 15 and identifies intention data "I want to reserve the projector." associated with the intention label "A projector for a meeting room" in the current meeting room reserve domain. Then, the responding section 45 provides, to the user, an audio response "Do you want to use a projector?" that is a detail that leads to the intention data "I want to reserve the projector.".

The domain switching section 44 is a processing section that switches between domains when the domain determining section 42 determines that an estimated domain is not appropriate. For example, when the domain determining section 42 determines that the domain is not appropriate, the domain switching section 44 uses a result of estimating an intention label obtained before the estimation of the domain to select an appropriate domain and switches the domain to the selected domain.

Figure 11:
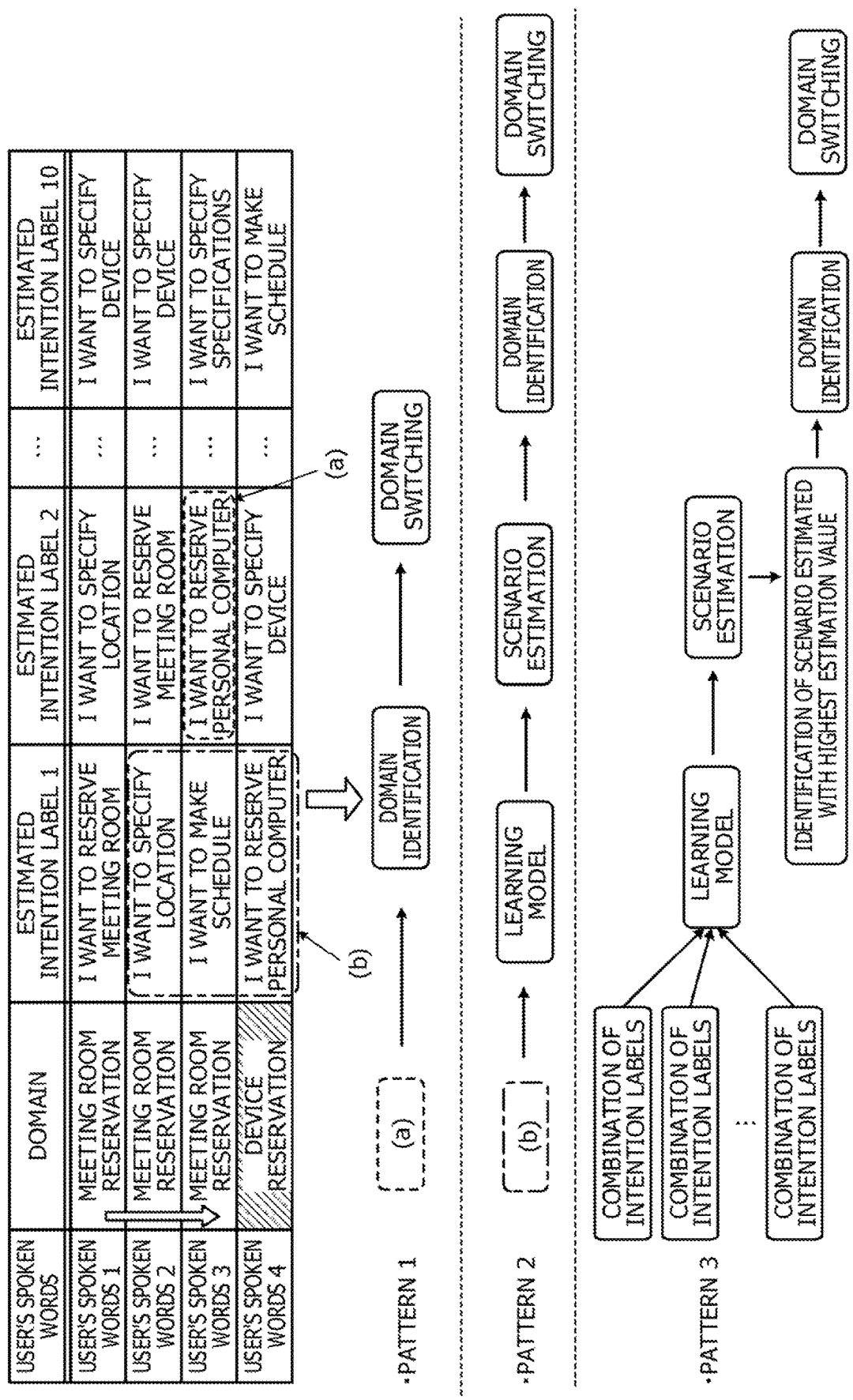
FIG. 11 is a diagram describing domain switching.

FIG. 11 is a diagram describing the domain switching. As illustrated in FIG. 11, the domain switching section 44 executes the domain switching when the "device reservation domain" that is different from the "meeting room reservation domain" is estimated for a word 4 likely to be spoken by the user next in a state in which the "meeting room reservation domain" is estimated for user's spoken words 1 to 3. For example, the domain switching section 44 executes the domain switching in any of patterns 1, 2, and 3. The pattern 1 is an example of a first requirement. The patterns 2 and 3 are examples of a second requirement.

In the pattern 1, the domain switching section 44 executes the domain switching using multiple intention labels estimated from the user's spoken word 3 immediately before the word 4, which is likely to be spoken by the user next and has triggered the domain switching. In the example illustrated in FIG. 11, the domain switching section 44 identifies an intention label "I want to reserve a personal computer" estimated with the second highest accuracy among ten intention labels estimated from the user's spoken word 3, without identifying the intention label "I want to make a schedule" used for an actual response and estimated with the highest accuracy among the ten intention labels estimated from the user's spoken word 3. Then, the domain switching section 44 references the domain DB 15, identifies a domain to which the intention label "I want to reserve a personal computer" belongs, and switches a current domain to the identified domain.

In the pattern 2, the domain switching section 44 executes the domain switching using the flow of intentions of the user's spoken words 1 to 3 and the word 4, which is likely to be spoken by the user next and has triggered the domain switching. For example, the domain switching section 44 inputs, to the learned learning model for the scenario estimation, an intention label estimated with the highest accuracy for each of the user's spoken words 1 to 3 and the word 4 likely to be spoken by the user next, and estimates a scenario. In the example illustrated in FIG. 11, the domain switching section 44 inputs, to the learned learning model for the scenario estimation, the intention label "I want to reserve a meeting room" estimated from the user's spoken word 1, the intention label "I want to specify a location" estimated from the user's spoken word 2, the intention label "I want to make a schedule" estimated from the user's spoken word 3, and the intention label "I want to reserve a personal computer" estimated from the word 4 likely to be spoken by the user next.

Then, the domain switching section 44 acquires the scenario as a result of the estimation. Subsequently, the domain switching section 44 references the scenario DB 16, identifies a domain to which the estimated scenario belongs, and switches a current domain to the identified domain.

In the pattern 3, the domain switching section 44 combines the intention labels estimated from the user's spoken words 1 to 3 and the word 4 likely to be spoken by the user next and executes the domain switching. In the example illustrated in FIG. 11, the domain switching section 44 selects one of multiple intention labels estimated from the user's spoken word 1, selects one of multiple intention labels estimated from the user's spoken word 2, selects one of multiple intention labels estimated from the user's spoken word 3, and selects one of multiple intention labels estimated from the word 4 likely to be spoken by the user next. Then, the domain switching section 44 inputs the selected four intention labels to the learned learning model for the scenario estimation and acquires the estimated scenario.

In the aforementioned manner, the domain switching section 44 uses intention labels estimated from user's spoken words and a word likely to be spoken next to generate combinations of the multiple intention labels and uses the learned learning model for the scenario estimation to acquire scenarios estimated from the combinations and estimated values. Then, the domain switching section 44 selects a scenario estimated with the highest accuracy (estimated value) from among the estimated multiple scenarios. After that, the domain switching section 44 references the scenario DB 16, identifies a domain to which the selected scenario belongs, and switches a current domain to the identified domain.

The domain switching section 44 notifies the domain after the switching to the processing sections. When the domain switching section 44 executes the domain switching in the pattern 1 but a current domain is not switched, the domain switching section 44 may execute the domain switching in the pattern 2 or 3 or a combination of two or more of the patterns.

Return to FIG. 2. The responding section 45 is a processing section that provides a response to a user's spoken word. For example, the responding section 45 provides, to the user, an audio response indicating a detail based on a result of the estimation by the intention estimating section 41, a result of the determination by the domain determining section 42, a result of the prediction by the conversation predicting section 43, and a result of the switching by the domain switching section 44.

For example, when the domain determining section 42 determines that a domain is appropriate and the conversation prediction is not executed by the conversation predicting section 43, the responding section 45 uses the interaction DB 17 or the like to provide a response to the latest user's spoken word. As an example, the responding section 45 provides a response "Reservation has been completed", "I understood", or the like.

When the domain determining section 42 determines that the domain is appropriate, the responding section 45 inputs, to the learned learning model for the scenario estimation, the flow of intention labels already estimated before the determination. Then, the responding section 45 provides a response indicating a detail based on the estimated scenario to the user's spoken word. As an example, when the scenario is estimated as the "meeting room reservation scenario", the responding section 45 provides an audio response indicating a detail inquiring about whether an additional device such as a projector or a personal computer is to be installed.

When the domain determining section 42 determines that the domain is appropriate and the conversation predicting section 43 executes the conversation prediction, the responding section 45 provides a response based on a result of the prediction. For example, it is assumed that the responding section 45 predicts the intention label "A projector for a meeting room" for a user's spoken word. In this case, the responding section 45 provides an audio response "I understood" or the like as a response to the user's spoken word. After that, the responding section 45 provides, to the user, a proposed audio message "Do you want to use a projector?" or the like.

When the domain switching section 44 executes the domain switching, the responding section 45 provides, to the user, an inquiry about whether a domain after the switching is appropriate. For example, when the domain is switched from the "meeting room reservation domain" to the "device reservation domain", the responding section 45 provides, to the user, an audio message "Do you reserve a device?". After that, when a user's spoken affirmative word "Yes" or the like is detected, the responding section 45 provides an audio message "What do you reserve?" or the like that promotes the user to speak more words. On the other hand, when a user's spoken negative word "No" or the like is detected, the responding section 45 may request the domain switching section 44 to execute the domain switching again or may provide an audio message "May I help you?" or the like that inquires about an intention of the conversation.

Figure 12:
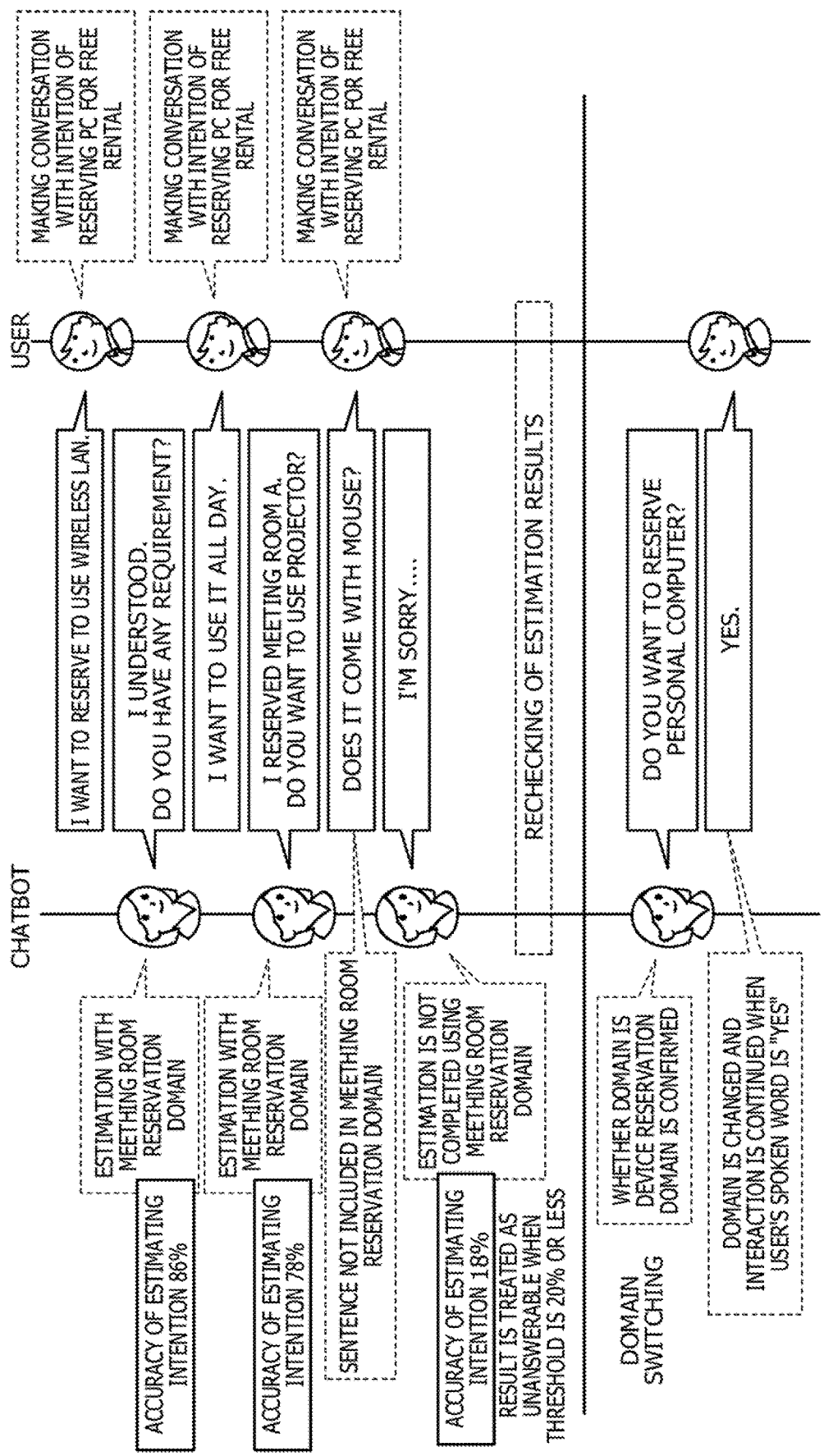
FIG. 12 is a diagram describing a specific example.

Next, a specific example is described using a specific conversation. FIG. 12 is a diagram describing the specific example. As illustrated in FIG. 12, the user speaks words "I want to reserve to use a wireless LAN" with an intention of reserving a PC for free rental. The interactive device 10 inputs the user's spoken words "I want to reserve to use a wireless LAN" as intention data to the learned learning model for the intention estimation and acquires results of estimating intention labels.

Then, the interactive device 10 selects an intention label estimated with the highest accuracy from among the estimation results and identifies the "meeting room reservation domain" to which the selected intention label belongs. Subsequently, the interactive device 10 selects a response detail "I understood. Do you have any requirement?" within the "meeting room reservation domain" and provides an audio response indicating the selected response detail.

Then, the user speaks words "I want to use it all day." with the intention of reserving a PC for free rental. The interactive device 10 inputs, as intention data, the user's spoken words "I want to use it all day." to the learned learning model for the intention estimation and acquire results of estimating intention labels.

Then, the interactive device 10 selects an intention label estimated with the highest accuracy from among the estimation results and identifies the "meeting room reservation domain" to which the selected intention label belongs. Since the "meeting room reservation domain" matches the domain previously identified, the interactive device 10 continuously executes the interaction within the "meeting room reservation domain", selects a response detail "I reserved the meeting room A. Do you want to use a projector?", and provides an audio response indicating the selected response detail.

Then, the user speaks words "Does it come with a mouse?" with the intention of reserving a PC for free rental. The interactive device 10 inputs, as intention data, the user's spoken words "Does it come with a mouse?" to the learned learning model for the intention estimation and acquires results of estimating intention labels.

When the interactive device 10 identifies, based on the estimation results, that the accuracy of estimating the "meeting room reservation domain" is low, the interactive device 10 determines that the domain estimated is not appropriate, provides an audio response "I'm sorry" or the like, executes the domain switching, and rechecks estimation results.

After that, when the interactive device 10 estimates that the current domain is to be switched to the "device reservation domain", the interactive device 10 provides an audio message "Do you intend to reserve a personal computer?" or the like to the user as a message inquiring for the "device reservation domain". In this manner, the interactive device 10 quickly estimates a conversation topic, determines whether the conversation topic is applicable, and executes appropriate conversation topic switching.

Figure 13:
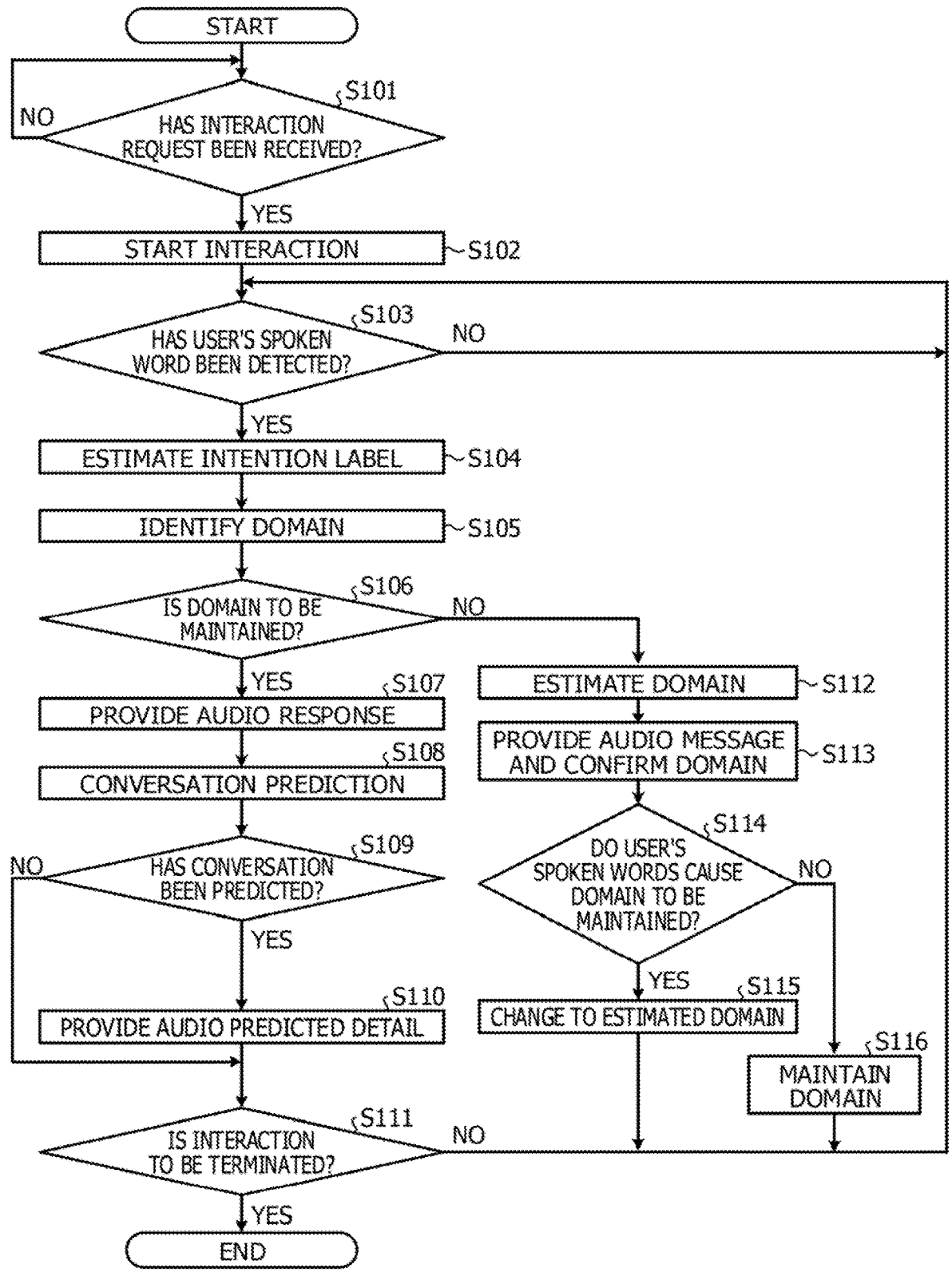
FIG. 13 is a flowchart illustrating the flow of an interaction process.

FIG. 13 is a flowchart illustrating the flow of an interaction process. The following assumes that the learning by the learning section 30 is already completed. As illustrated in FIG. 13, when the interactive device 10 receives an interaction request from the user (Yes in step S101), the interactive device 10 displays a chatbot screen or the like and starts interaction (in step S102).

When the intention estimating section 41 detects a user's spoken word (Yes in step S103), the intention estimating section 41 inputs the user's spoken word to the learned learning model for the intention estimation and estimates intentions (intention labels) (in step S104). Then, the domain determining section 42 selects an intention label estimated with the highest accuracy from among the estimated intention labels and identifies a domain (in S105).

When the domain determining section 42 determines that the identified domain is to be maintained (Yes in S106), the responding section 45 provides an audio response to the user's spoken word (in S107). Then, the conversation predicting section 43 inputs the intention labels estimated before a current time to the learned learning model for the intention estimation and predicts a conversation (in S108).

When the conversation is predicted (Yes in S109), the responding section 45 provides an audio response based on the predicted conversation (in S110). When the user performs an operation of terminating the interaction (Yes in S111), the interactive device 10 terminates the interaction. When the interaction is continuously executed (No in S111), the interactive device 10 repeatedly executes S103 and later. When the conversation is not predicted (No in S109), S111 is executed without the execution of S110.

When the domain determining section 42 determines that the domain is not to be maintained (No in S106), the domain switching section 44 estimates another domain using results of estimating the intention labels already estimated (S112).

Then, the responding section 45 provides, to the user, an audio message inquiring about whether the other domain estimated by the domain switching section 44 is appropriate, and confirms the domain (in S113).

After that, when a user's spoken word that causes the domain after the switching to be maintained is detected (Yes in S114), the domain switching section 44 changes the domain to the other domain estimated (in S115). When a user's spoken word that does not cause the domain after the switching to be maintained is detected (No in S114), the current domain is maintained or the domain switching is executed again (in S116). After S115 and S116, S103 and later are executed. When the user performs an operation of terminating the interaction during the interaction process illustrated in FIG. 13, the interaction process is terminated regardless of the order of the processes.

The interactive device 10 according to the first embodiment may use learning results to execute push-type audio output to autonomously provide an audio response to the user. The interactive device 10 may learn a continuous conversation of user's spoken words and appropriately select a conversation topic (domain) in interaction with the user.

The interactive device 10 may present multiple candidates in descending order of estimation accuracy in the intention estimation, re-estimate what the user wanted to say from past (latest) interaction histories, and enable natural interaction. Accordingly, the interactive device 10 may reduce user's distrust in a mechanical conversation and improve convenience for the user.

Although the first embodiment describes the example in which the interaction with the user is executed using the information stored in the interactive device 10, the first embodiment is not limited to this. For example, the interactive device 10 may collect the information from an external server or an external DB and provides a response based on results of estimating intention labels from a user's spoken word.

Figure 14:
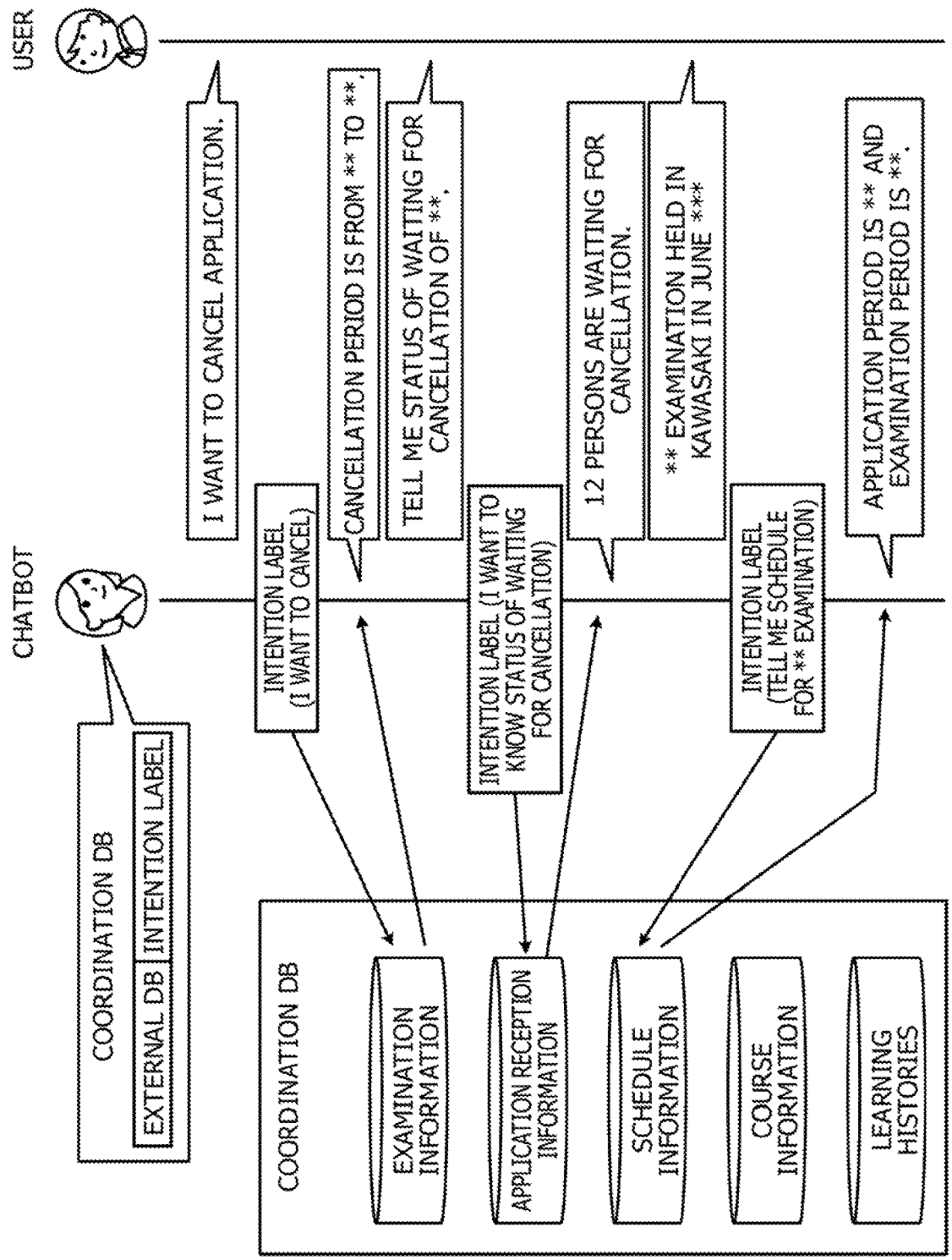
FIG. 14 is a diagram describing coordination with an external DB.

FIG. 14 is a diagram describing coordination with the external DB. As a premise, the interactive device 10 stores a coordination DB in which intention labels are associated with the external DB to be referenced. Information on the external DB stored in the coordination DB is an example of system information that enables the external DB to be searched. The information on the external DB is identification information such as Uniform Resource Locators (URLs), Internet Protocol (IP) addresses, or the like and may include login IDs.

When the interactive device 10 receives first information from the user and receives second information input by the user after the reception of the first information during the execution of the interaction process, the interactive device 10 transmits a search requirement including the second information to a system that has been identified by identified system information and may be searched. Then, when the interactive device 10 receives a search result based on the transmitted search requirement, the interactive device 10 presents the received search result to the user.

For example, when user's spoken words "I want to know information on the examination" are input to the interactive device 10 from the user, the intention estimating section 41 of the interactive device 10 uses the learned learning model for the intention estimation to identify an intention label "I want to know examination information" from the user's spoken words "I want to know information on the examination". Then, the responding section 45 of the interactive device 10 references the coordination DB and identifies an examination information DB stored in the external DB and associated with the intention label "I want to know examination information".

After that, when the interactive device 10 receives user's spoken words "I want to know a date of application for  examination", the responding section 45 of the interactive device 10 extracts search keywords " examination" and "date of application" from the user's spoken words. Then, the responding section 45 of the interactive device 10 uses the search keywords to search the examination information DB and acquires "from November 30 to December 20" as a search result. After that, the responding section 45 of the interactive device 10 provides an audio response indicating the search result "from November 30 to December 20" to the user. As a method of extracting the search keywords, one or more of known various methods such as a method using a word obtained by morphological analysis may be used.

As a specific example, as illustrated in FIG. 14, when the interactive device 10 receives user's spoken words "I want to cancel the application", the interactive device 10 inputs the received user's spoken words to the learned learning model for the intention estimation and estimates an intention label "I want to cancel". Then, the responding section 45 of the interactive device 10 references the coordination DB, accesses the "examination information" DB stored in the external DB and associated with the intention label "I want to cancel", acquires cancellation information, and provides an audio response "The cancellation period is from  to .".

When the interactive device 10 receives user's spoken words "Tell me a status of waiting for cancellation of **", the interactive device 10 inputs the received user's spoken words to the learned learning model for the intention estimation and estimates an intention label "I want to know a status of waiting for cancellation". Then, the responding section 45 of the interactive device 10 references the coordination DB, accesses an "application reception information" DB stored in the external DB and associated with the intention label "I want to know a status of waiting for cancellation", acquires reception information, and provides an audio response "12 persons are waiting for cancellation.".

When the interactive device 10 receives user's spoken words " examination to be held in Kawasaki in June *", the interactive device 10 inputs the received user's spoken words to the learned learning model for the intention estimation and estimates an intention label "Tell me a schedule for  examination". Then, the responding section 45 of the interactive device 10 references the coordination DB, accesses a "schedule information" DB stored in the external DB and associated with the intention label "Tell me a schedule for  examination", acquires schedule information, and provides an audio response "The application period is  and the examination period is ".

As described above, since the interactive device 10 may acquire information from an external device and provide a response based on a user's intention, the interactive device 10 may appropriately handle the user's intention and a user's request.

The interactive device 10 may generate new learning data (teacher data) from histories of interaction with the user and periodically repeat relearning of the learned learning model for the intention estimation, thereby continuously updating estimation accuracy of the learning model for the intention estimation.

Figure 15:
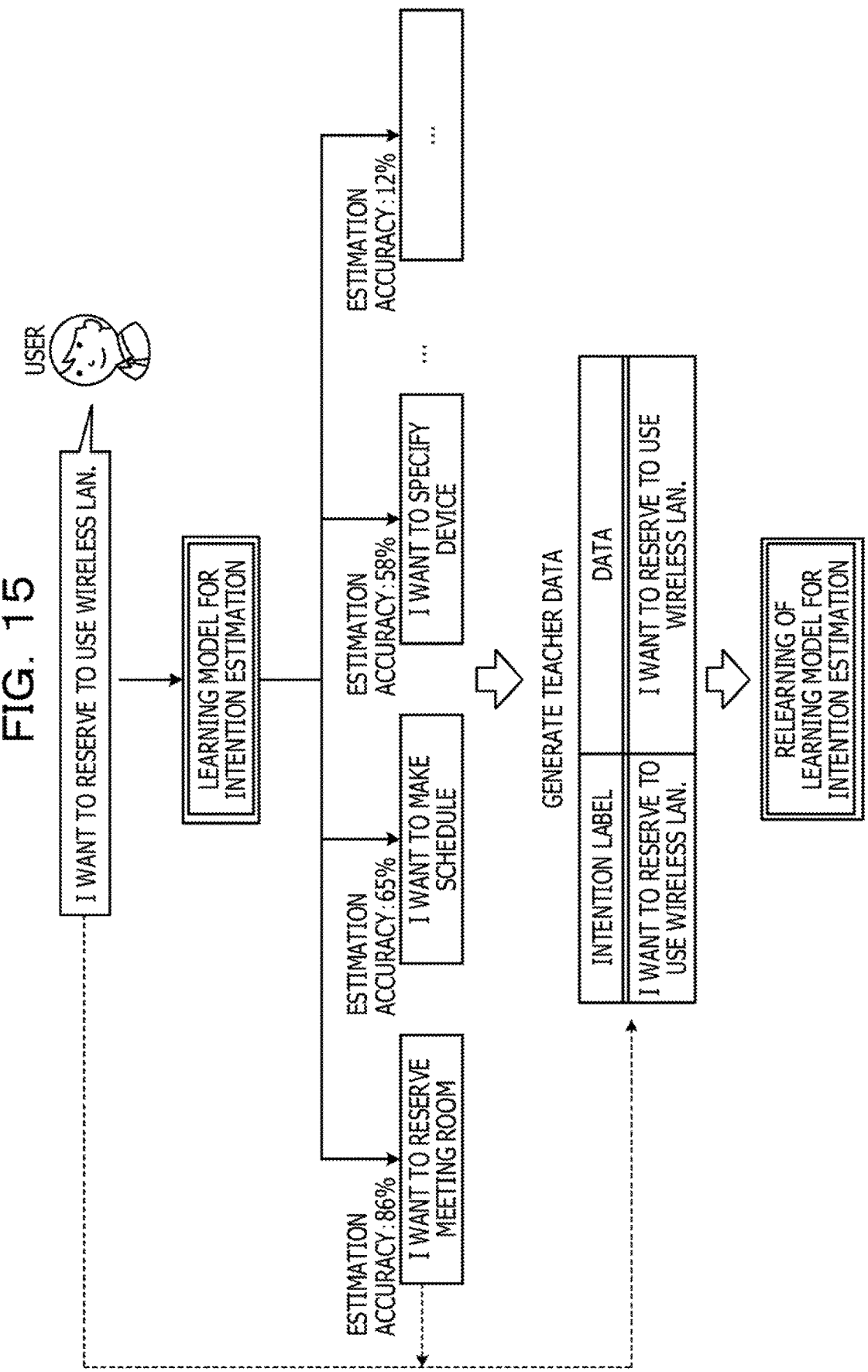
FIG. 15 is a diagram describing relearning for intention label estimation.

FIG. 15 is a diagram describing relearning for intention label estimation. As illustrated in FIG. 15, when the interactive device 10 detects the user's spoken words "I want to reserve to use a wireless LAN.", the intention estimating section 41 uses the learned learning model for the intention estimation to acquire, as estimation results, "I want to reserve a meeting room, 86%", "I want to make a schedule, 65%", and the like.

In this case, the intention learning section 31 generates teacher data in which the user's spoken words "I want to reserve to use a wireless LAN." are treated as an explanatory variable and in which the intention label "I want to reserve a meeting room." estimated with the highest accuracy is treated as an objective variable. Then, the intention learning section 31 relearns the learned learning model for the intention estimation so that when data "I want to reserve to use a wireless LAN." is input to the learning model for the intention estimation, the intention label "I want to reserve a meeting room." is output from the learning model for the intention estimation.

Figure 16:
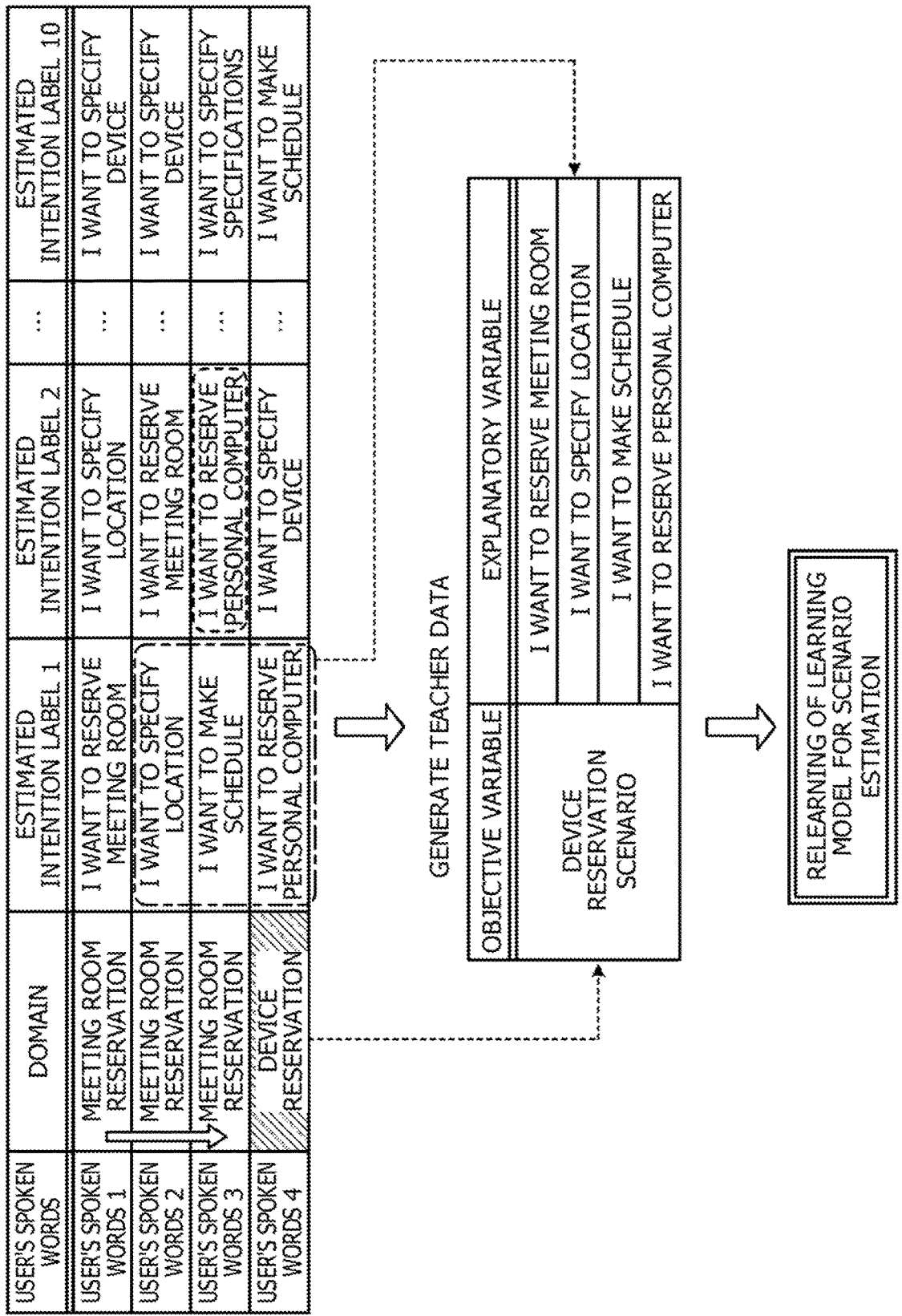
FIG. 16 is a diagram describing relearning for scenario estimation.

FIG. 16 is a diagram describing relearning for the scenario estimation. As illustrated in FIG. 16, when the interactive device 10 detects user's spoken words four times, the scenario learning section 32 generates teacher data in which a combination (flow) of intention labels estimated with the highest accuracy from the first, second, third, and fourth user's spoken words is treated as an explanatory variable and in which a domain estimated from the fourth user's spoken words is treated as an objective variable.

In the example illustrated in FIG. 16, the scenario learning section 32 generates, as "correct information, data", "device reservation, (I want to reserve a meeting room, I want to specify a location, I want to make a schedule, and I want to reserve a personal computer)". Then, when the intention labels "I want to reserve a meeting room", "I want to specify a location", "I want to make a schedule", and "I want to reserve a personal computer" are input in this order, the scenario learning section 32 relearns the learning model for the scenario estimation to estimate a "device reservation scenario" as a scenario.

The scenario learning section 32 may generate teacher data in which the first to third intention labels are treated as an explanatory variable and in which the first to fourth intention labels are treated as an objective variable. For example, the scenario learning section 32 generates, as "correct information, data", "I want to reserve a personal computer, (I want to reserve a meeting room, I want to specify a location, and I want to make a schedule)". Then, when the intention labels "I want to reserve a meeting room", "I want to specify a location", and "I want to make a schedule" are input in this order, the scenario learning section 32 relearns the learned learning model for the intention estimation to estimate, as the fourth intention label, the intention label "I want to reserve a personal computer".

In the aforementioned manner, the interactive device 10 may generate new learning data from histories of actually executed interaction with the user and periodically learn and update the learned learning models. Since a human intention may be input to the learning models, compared with learning using only academic data or statistical data, the interaction by the interactive device 10 may be similar to a human conversation.

Although the embodiment is described above, the disclosure may include various modifications as well as the aforementioned embodiment.

The aforementioned values, data examples, values indicating set details of labels, message details, and displayed chatbot screen, which are described in the embodiment, are an example and may be arbitrarily changed. The intention labels are an example of categories and may be other information as long as indices as the intention labels are able to be classified. The domains are an example of conversation topics. Details input using a keyboard by the user may be processed in the same manner as the user's spoken words.

Although the embodiment describes the example using the chatbot, the embodiment is not limited to this. For example, a web browser or the like may be used. The Internet may not be used and an intranet or the like may be used. For example, the disclosure is applicable to not only a FAQ for an ordinary user but also an in-house FAQ.

The aforementioned process procedures, control procedures, specific names, and information including various data and parameters that are described in the present specification and illustrated in the drawings may be arbitrarily changed unless otherwise specified.

The constituent components of the devices illustrated in the drawings are functionally conceptual and may not be physically configured as illustrated in the drawings. Specific forms of distribution and integration of the devices are not limited to those illustrated in the drawings. All or some of the devices may be functionally or physically distributed or integrated in arbitrary units based on various loads, usage statuses, or the like. For example, the learning section 30 and the interactive processing section 40 may be installed in different devices. The intention estimating section 41 is an example of a first identifying section. The domain determining section 42 is an example of a first selecting section. The domain switching section 44 is an example of a second identifying section and a second selecting section. The responding section 45 is an example of the first identifying section, the second identifying section, a transmitting section, and a presenting section.

All or some of the processing functions to be executed by the devices may be enabled by a CPU and a program analyzed and executed by the CPU or may be enabled by hardware by wired logic.

Figure 17:
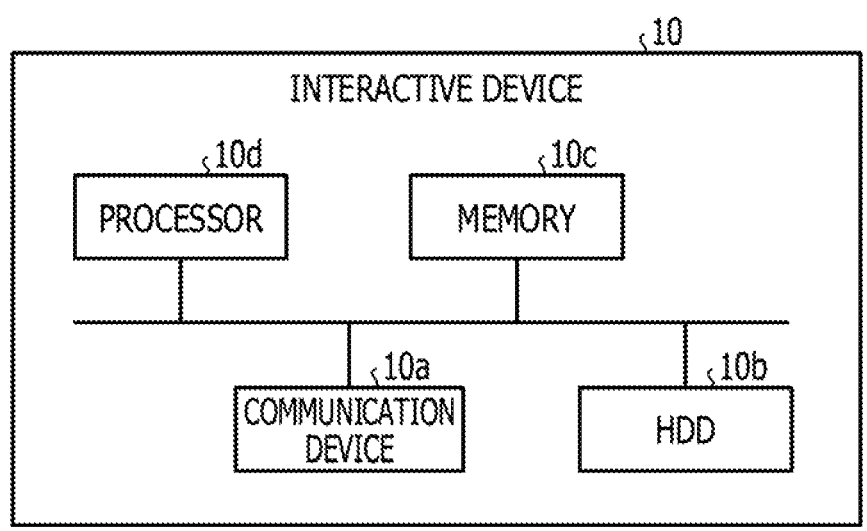
FIG. 17 is a diagram describing an example of a hardware configuration.

FIG. 17 is a diagram describing an example of a hardware configuration. As illustrated in FIG. 17, the interactive device 10 includes a communication device 10a, a hard disk drive (HDD) 10b, a memory 10c, and a processor 10d. The devices illustrated in FIG. 17 are coupled to each other via a bus or the like.

The communication device 10a is a network interface card or the like and executes communication with another server. The HDD 10b stores a program for causing the functional sections illustrated in FIG. 2 to operate and stores the DBs illustrated in FIG. 2.

The processor 10d reads, from the HDD 10b or the like, a program for executing the same processes as those of the processing sections illustrated in FIG. 2 and loads the program into the memory 10c, thereby executing a process of executing the functions described with reference to FIG. 2 and the like. The process executes the same functions as the processing sections included in the interactive device 10. For example, the processor 10d reads, from the HDD 10b or the like, the program having the same functions as the learning section 30, the interactive processing section 40, and the like. Then, the processor 10d executes the process of executing the same functions as the learning section 30, the interactive processing section 40, and the like.

The interactive device 10 reads and executes the program, thereby operating as an information processing device for executing the interaction process. The interactive device 10 may cause a medium reading device to read the program from a recording medium and execute the read program, thereby enabling the same functions as those described in the embodiment. The program according to another embodiment may not be executed by the interactive device 10. For example, the disclosure is applicable to the case where another computer or a server executes the program and to the case where the other computer and the server collaborate with each other to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented interaction control method comprising:
    acquiring one or more categories from a plurality of pieces of information input by a user by using a first machine learning model for estimating the one or more categories from information;
    determining, based on a first requirement, a first category with highest accuracy from the one or more categories estimated from each of the plurality of pieces of information by using the first machine learning model;
    selecting, based on the determined first category, a first conversation topic for interaction with the user from conversation topics;
    executing, by using the first conversation topic, the interaction with the user via a user interface;
    determining, when a latest conversation topic from the user is different from the first conversation topic in accordance with a result of the interaction executed by using the first conversation topic, based on a second requirement, a second category from the one or more categories;
    estimating a first scenario that indicates an order of a first plurality of conversation topics that relate to the second category by inputting the first conversation topic and the latest conversation topic to a second machine learning model, the second machine learning model estimating a scenario that indicates an order of a plurality of conversation topics that relates to an order of input categories;
    selecting, based on the determined second category, a second conversation topic from the first plurality of conversation topics in the order of the first scenario for the interaction with the user from the conversation topics; and
    executing, by using the second conversation topic, the interaction with the user via the user interface.

2. The interaction control method according to claim 1, further comprising: detecting that the first conversation topic is inappropriate when a latest conversation topic is different from the first conversation topic wherein
    the second requirement indicates second highest accuracy, and
    the determining of the second category includes selecting, as the second category, a category estimated with the second highest accuracy from the one or more categories estimated by the first machine learning model.

3. The interaction control method according to claim 1, further comprising:
    when detecting that the first conversation topic is appropriate in accordance with the result of the interaction executed by using the first conversation topic, estimating, based on an order of the one or more categories including the first category, a next category by the first machine learning model, and
    providing the user, via the user interface, with a content corresponding to the next category.

4. The interaction control method according to claim 3, further comprising:
    generating learning data in which the order of the one or more categories including the first category is treated as an explanatory variable and in which a category estimated from another information input by the user during the interaction is treated as an objective variable; and
    updating the first machine learning model by using the generated learning data.

5. The interaction control method according to claim 1, further comprising:
    when detecting that the first conversation topic is appropriate in accordance with the result of the interaction executed by using the first conversation topic, acquiring information from an external device in accordance with the first category, and
    providing the user with the information.

6. The interaction control method according to claim 1, further comprising:
    generating learning data in which the plurality of pieces of information are treated as an explanatory variable and in which the first category estimated with the highest accuracy is treated as an objective variable; and
    updating the first machine learning model by using the generated learning data.

7. An interaction control system comprising:
    one or more memories; and
    one or more processors coupled to the one or more memories and the one or more processors configured to:
        acquire one or more categories from a plurality of pieces of information input by a user by using a first machine learning model for estimating the one or more categories from information,
        perform, based on a first requirement, determination of a first category with highest accuracy from the one or more categories estimated from each of the plurality of pieces of information by using the first machine learning model, select, based on the determined first category, a first conversation topic for interaction with the user from conversation topics, execute, by using the first conversation topic, the interaction with the user via a user interface, determine, when a latest conversation topic from the user is different from the first conversation topic in accordance with a result of the interaction executed by using the first conversation topic, based on a second requirement, a second category from the one or more categories, estimate a first scenario indicating that indicates an order of a first plurality of conversation topics that relate to the second category by inputting the first conversation topic and the latest conversation topic to a second machine learning model, the second machine learning model estimating a scenario that indicates an order of a plurality of conversation topics that relates to an order of input categories, select, based on the determined second category, a second conversation topic from the first plurality of conversation topics in the order of the first scenario for the interaction with the user from the conversation topics, and execute, by using the second conversation topic, the interaction with the user via the user interface.

8. The interaction control system according to claim 7, wherein the one or more processors is configured to detect that the first conversation topic is inappropriate when a latest conversation topic is different from the first conversation topic, the second requirement indicates second highest accuracy, and the determination of the second category includes selecting, as the second category, a category estimated with the second highest accuracy from the one or more categories estimated by the first machine learning model.

9. The interaction control system according to claim 7, wherein the one or more processors is configured to:
  when detecting that the first conversation topic is appropriate in accordance with the result of the interaction executed by using the first conversation topic, estimate, based on an order of the one or more categories including the first category, a next category by the first machine learning model, and
  provide the user, via the user interface, with a content corresponding to the next category.

10. The interaction control system according to claim 9, wherein the one or more processors is configured to:
  generate learning data in which the order of the one or more categories including the first category is treated as an explanatory variable and in which a category estimated from another information input by the user during the interaction is treated as an objective variable; and
  update the first machine learning model by using the generated learning data.

11. The interaction control system according to claim 7, wherein the one or more processors is configured to:
  when detecting that the first conversation topic is appropriate in accordance with the result of the interaction executed by using the first conversation topic, acquire information from an external device in accordance with the first category, and
  provide the user with the information.

12. The interaction control system according to claim 7, wherein the one or more processors is configured to:
  generate learning data in which the plurality of pieces of information are treated as an explanatory variable and in which the first category estimated with the highest accuracy is treated as an objective variable; and
  update the first machine learning model by using the generated learning data.

13. A computer-implemented interaction control method comprising:
  determining, based on a first requirement, a first category with highest accuracy from one or more categories estimated from each of a plurality of pieces of information by using a first machine learning model;
  selecting, based on the determined first category, a first conversation topic for interaction with the user from conversation topics;
  executing, by using the first conversation topic, the interaction with the user via a user interface;
  determining, when a latest conversation topic from the user is different from the first conversation topic in accordance with a result of the interaction executed by using the first conversation topic, based on a second requirement, a second category from the one or more categories;
  estimating a first scenario that indicates an order of a first plurality of conversation topics that relate to the second category by inputting the first conversation topic and the latest conversation topic to a second machine learning model, the second machine learning model estimating a scenario that indicates an order of a plurality of conversation topics that relates to an order of input categories;
  selecting, based on the determined second category, a second conversation topic from the first plurality of conversation topics in the order of the first scenario for the interaction with the user from the conversation topics; and
  executing, by using the second conversation topic, the interaction with the user via the user interface.

* * * * *